Oct. 1, 1963   J. T. BICKMORE ETAL   3,105,777
XEROGRAPHIC DEVELOPING APPARATUS
Filed April 4, 1960   9 Sheets-Sheet 1

INVENTOR.
JOHN T. BICKMORE
HAROLD BOGDONOFF
WILLIAM J. BURRIS
BY
ATTORNEY

INVENTOR.
JOHN T. BICKMORE
HAROLD BOGDONOFF
WILLIAM J. BURRIS
BY
ATTORNEY

INVENTOR.
JOHN T. BICKMORE
HAROLD BOGDONOFF
WILLIAM J. BURRIS
BY
ATTORNEY

INVENTOR.
JOHN T. BICKMORE
HAROLD BOGDONOFF
WILLIAM J. BURRIS
BY
ATTORNEY

Oct. 1, 1963

J. T. BICKMORE ETAL 3,105,777

XEROGRAPHIC DEVELOPING APPARATUS

Filed April 4, 1960

INVENTOR.
JOHN T. BICKMORE
HAROLD BOGDONOFF
WILLIAM J. BURRIS
BY

ATTORNEY

Oct. 1, 1963 J. T. BICKMORE ETAL 3,105,777
XEROGRAPHIC DEVELOPING APPARATUS
Filed April 4, 1960 9 Sheets-Sheet 6
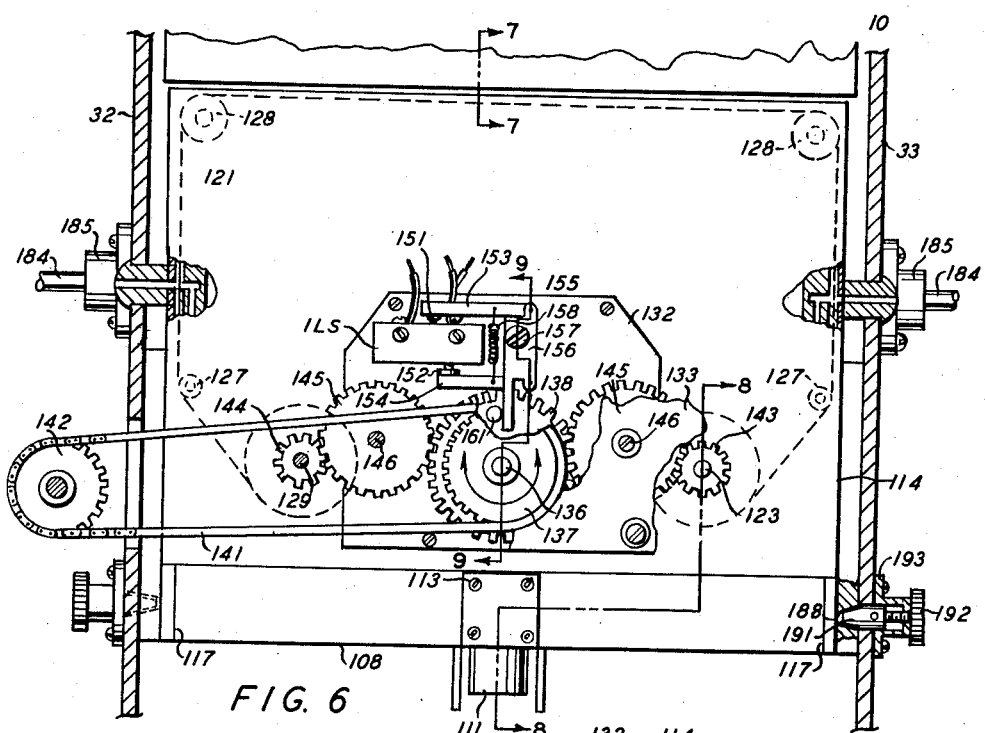
FIG. 6
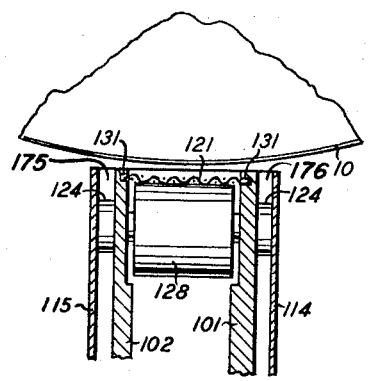
FIG. 7
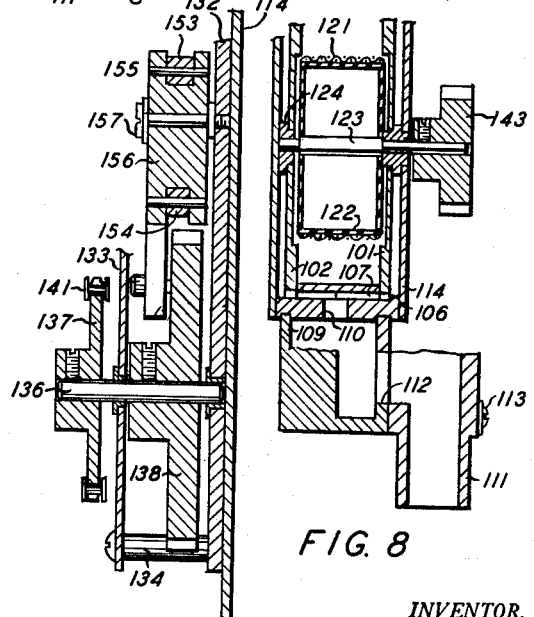
FIG. 8
FIG. 9
INVENTOR.
JOHN T. BICKMORE
HAROLD BOGDONOFF
WILLIAM J. BURRIS
BY
ATTORNEY

INVENTOR.
JOHN T. BICKMORE
HAROLD BOGDONOFF
WILLIAM J. BURRIS
BY
ATTORNEY

Oct. 1, 1963   J. T. BICKMORE ETAL   3,105,777
XEROGRAPHIC DEVELOPING APPARATUS
Filed April 4, 1960   9 Sheets-Sheet 8

INVENTOR.
JOHN T. BICKMORE
HAROLD BOGDONOFF
BY WILLIAM J. BURRIS

ATTORNEY

INVENTOR.
JOHN T. BICKMORE
HAROLD BOGDONOFF
WILLIAM J. BURRIS
BY
ATTORNEY

3,105,777
XEROGRAPHIC DEVELOPING APPARATUS
John T. Bickmore and Harold Bogdonoff, Rochester, and William J. Burris, Webster, N.Y., assignors to Xerox Corporation, a corporation of New York
Filed Apr. 4, 1960, Ser. No. 19,952
3 Claims. (Cl. 118—637)

This invention relates to the field of xerography and, in particular, to an improved device for use in the development of xerographic images.

In the art of xerography an electrostatic latent image is formed on an insulating surface, such as, for example, a photoconductive insulating layer or electrophotographic surface by the combined action of an electric field applied through a photoconductive material and action of light or suitable activating radiation on the photoconductive material to cause selective conductivity in accordance with the pattern of radiation to which the material is exposed. The result of this combined exposure and field is a pattern of electric charge known to the art as an electrostatic latent image which is capable of utilization, for example, by deposition thereon of finely divided material, such deposition being known in the art as development.

It has been found, as disclosed in U.S. 2,725,304 to Landrigan et al., and in U.S. 2,808,023 to Hayford, that an electrostatic latent image can be developed very satisfactorily by presenting to the image surface a cloud of charged powder particles with a conductive surface or development electrode positioned very closely adjacent to the image surface, preferably at a distance therefrom in the order of about $1/40$ to $1/100$ of an inch or in some instances even somewhat closer than $1/100$ inch. It has also been found by others in the art of xerography that one effective way of preparing a cloud of substantially uniformly charged particles is to form a powder cloud in a suitable cloud generator and pass the cloud under conditions of turbulence through a restricted opening, such as, for example, a capillary tube.

Basic to the use of the development electrode is the desire to reproduce copies of the original image of high quality and without distortion. Electrostatic lines of force exist between the electrostatic charges on the photoconductive insulating layer and areas of different charge potential. When large areas carrying electrostatic charges exist, the lines of force which are present due to charges in the central area of the large area tend to run inward through the photoconductive insulating layer to the conductive backing member which is the nearest surface carrying a different potential. Lines of force running from electrostatic charges near the external boundaries of this large area tend to extend outward and around the outside border of the large area at which point their paths extend inward through the photoconductive insulating layer to the conductive backing member. Development of such an electrostatic latent image creates deposition which relates to the paths taken by the electrostatic lines of force or development of the electrostatic fields. Therefore, development of a large area as has just been described tends to reproduce copies with hollow centers and emphasized edges. To prevent such development, a surface is positioned at a slight distance from the photoconductive insulating layer during development. This surface, the development electrode, is composed of a conductive material and is usually either biased or maintained at about the same potential as the plate backing member. Such an equipotential surface causes an increase in the lines of force extending outwardly from the plate member creating electrostatic fields which when developed produces distortion-free and fringe-free high quality copy.

In xerographic development according to these methods there are many inherent problems caused, among other things, by the need for working in an extremely confined space and with extremely fine tolerances, this need being brought about by the narrow space between the image surface and the development electrode. For example, the usual development of a xerographic image involves uniform deposition of powder particles or other finely divided particulate material, across an area of normal picture size which may, for example, be an area having a smallest dimension of several inches or an area having a smallest dimension of a foot or more. The introduction of a cloud uniformly across this entire area in a development space in the order of $1/40$ to $1/100$ inch thick has obviously presented many serious problems.

It has also been found in the art, as disclosed in Walkup 2,784,109 and in Jacob 2,752,833, that an electrostatic latent image can be developed by positioning a conductive electrode in the form of an open grid in closely spaced relation to a xerographic plate and projecting through the open grid into the space between the electrode and the xerographic plate a cloud of developer material to effect development of the electrostatic latent image.

Many of the devices used heretofore for powder cloud development were subject to various shortcomings, thus: When the powder cloud in its flow travels over an area that should be white and then over an area that should be dark, the leading edge of the dark area is frequently underdeveloped. On the developed image the dark area appears to be torn so that a white background shows through. Because of this appearance the flaw is referred to as "tearing." Another difficulty occurs when the powder cloud travels over a large, dark area and then over a large area that should remain white. Although the white area is void of charge, it does not always remain completely free of powder. Developer particles tend to deposit in streaks through this area in amounts roughly proportional to the length of the dark area that immediately precedes the white area. This difficulty is termed "streaking." Still another difficulty is that developed images are not always uniformly developed end-to-end, nor does extending the development time remedy this defect as, apparently, part of the charge in the image areas at one end of the plate are erased in the development process. Another difficulty encountered is that powder particles, striking the surface of the xerographic plate as a result of mechanical forces, not only adhere to the plate in appreciable quantities regardless of the charge on the plate, but the powder particles also abrade the surface of the plate thereby reducing the life of the xerographic plate in terms of the number of quality reproductions that can be made. Furthermore, known development electrodes are either substantially coextensive with the xerographic plate if a flat plate is used, or, in the cases where the xerographic plate is formed in the shape of a drum, the development electrode is coextensive with a substantially large portion of the peripheral surface of the xerographic plate.

In the case of continuous automatic machines in which a xerographic plate in the form of a drum is usually used, it is apparent that the greater the coverage of the development electrode over the peripheral surface of the drum, the less peripheral surface of the drum is made available in which to arrange the remaining elements of the machine to carry out the xerographic process. Another factor to be considered is that the larger the development electrode, related in terms of the peripheral surface of the drum, the longer is the development time for a given drum speed.

The principal object of the present invention is to improve the construction of xerographic development electrodes whereby high quality development of electrostatic images may be effected.

A further object of the invention is to improve moving screen development electrodes for use in continuous tone development.

A still further object of the invention is to improve the construction of a development electrode for close access xerographic reproductions.

These and other objects of the invention are attained by means of moving screen development electrode in which the screen is positioned for movement in a path in closely spaced relation to a cylindrical xerographic plate and parallel to the axis of the plate, means being provided to eject a cloud of developer material through the openings in the screen in the direction of the plate and to clean the screen of any excess developer material adhering to the screen.

For a better understanding of the invention as well as other objects and features thereof, reference is had to the following detailed description of the invention to be read in connection with the accompanying drawings, wherein:

FIG. 6 is a partial elevation view of the apparatus showing the development electrode assembly;

FIG. 7 is an enlarged sectional view taken along line 7—7 of FIG. 6;

FIG. 8 is an enlarged sectional view taken along line 8—8 of FIG. 6;

FIG. 9 is an enlarged sectional view taken along line 9—9 of FIG. 6;

Figure 1:
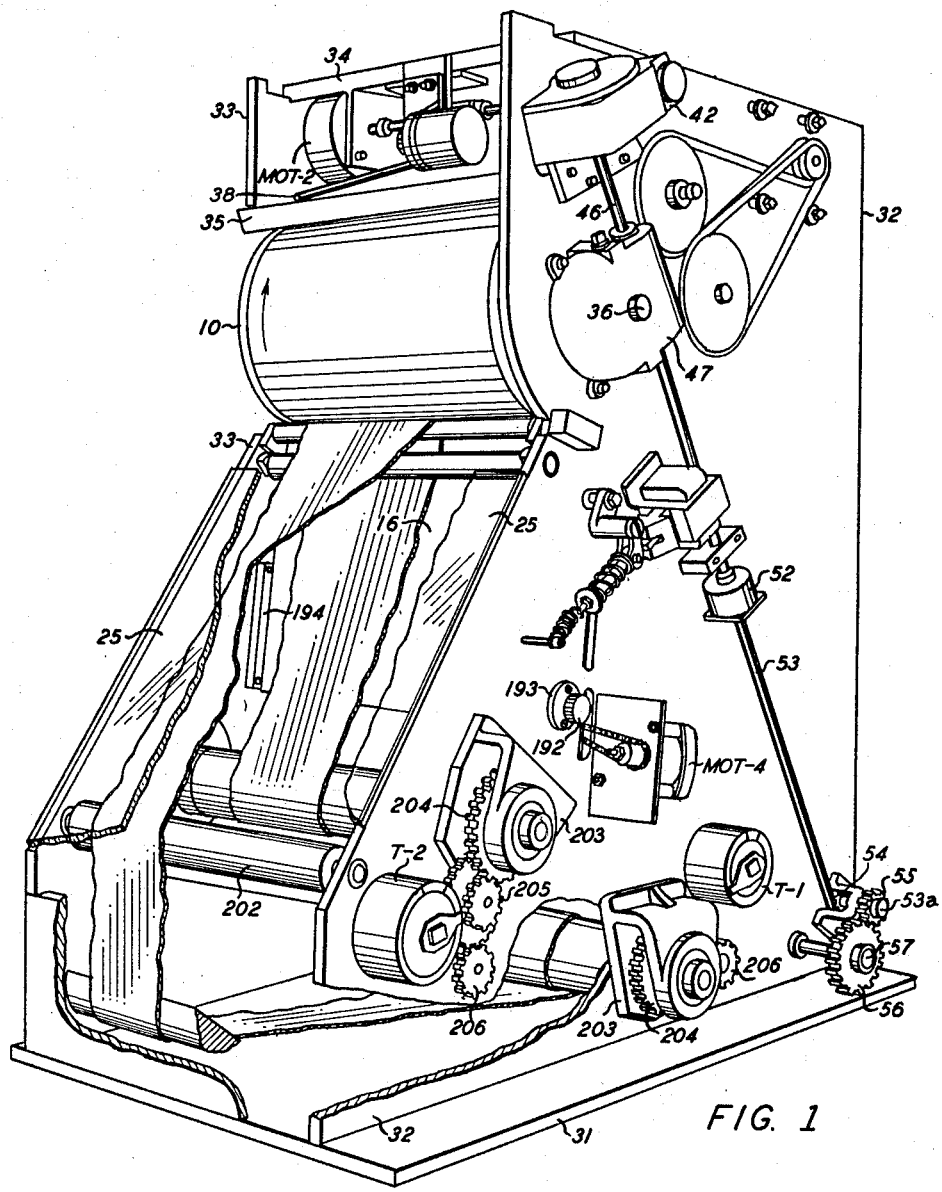
FIG. 1 is a right-hand perspective view, partly broken away to show structural details, of the xerographic apparatus of the invention.
Figure 2:
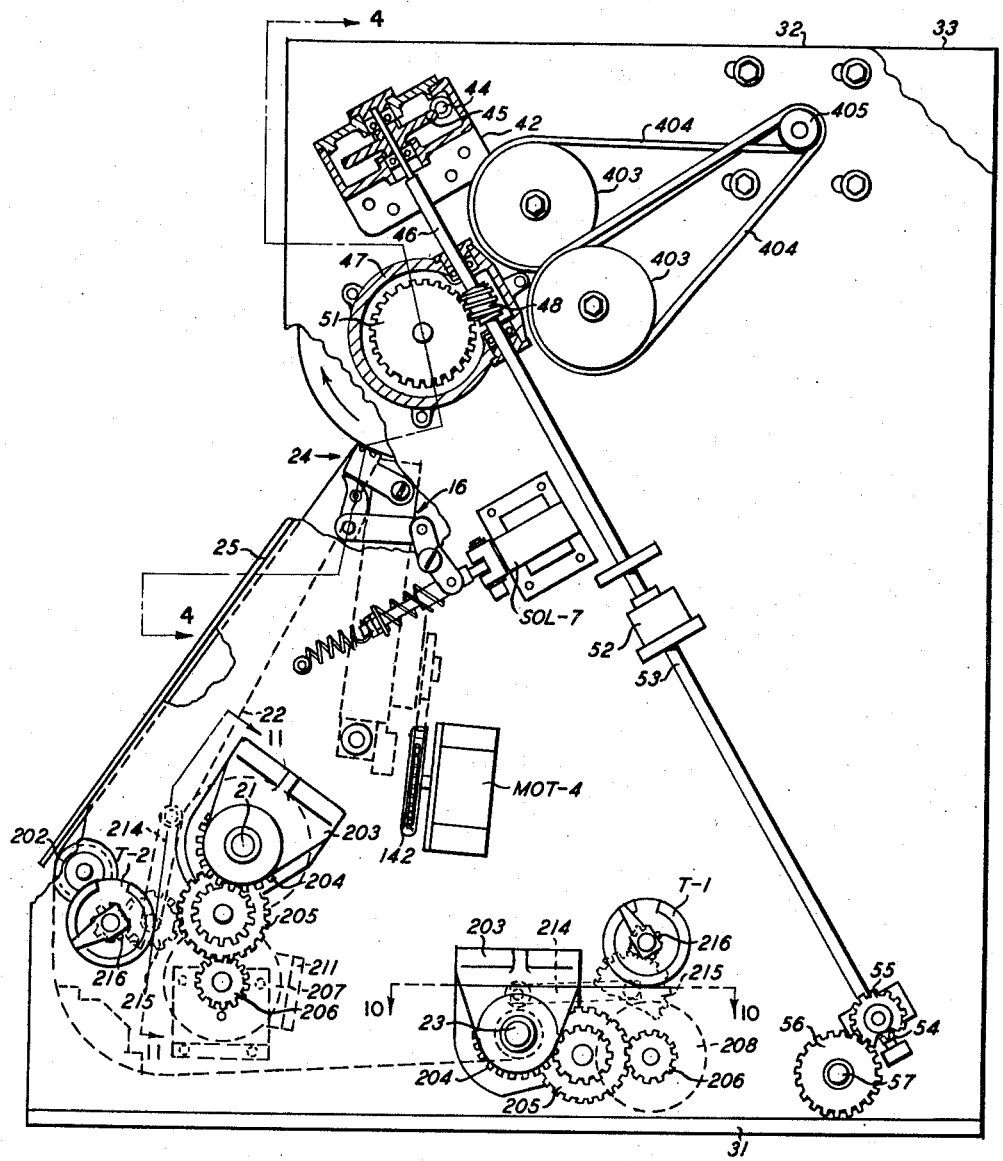
FIG. 2 is a right-hand view of the apparatus of FIG. 1.

Referring now to the drawings there is disclosed a preferred embodiment of a variable speed xerographic processor for producing continuous tone images. Specifically, the apparatus shown is a close-access xerographic recorder for use in an aircraft to produce permanent continuous tone images on a transfer material from suitable infrared or radar images of the objects to be reproduced while at the same time permitting members of the aircraft to view these images within a relatively short period of time.

As shown in the drawings the variable speed xerographic apparatus comprises a xerographic plate including a photoconductive layer or radiation-receiving surface on a conductive backing and formed in the shape of a drum, generally designated 10, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image pass over the drum surface, whereby the toner particles adhere to the electrostatic latent image to form a xerographic powder image in the configuration of the copy to be reproduced;

A transfer station, at which the xerographic powder image is transferred from the drum surface to a transfer material or support surface; and, A drum cleaning and discharge station, at which the drum surface is brushed to remove residual toner particles remaining thereon after image transfer, and at which the drum surface is exposed to a relatively bright light source to effect substantially complete discharge of any residual electrostatic charge remaining thereon.

The charging station is preferably located as indicated by reference character A. In general, the charging apparatus includes a corona discharge device 11 which consists of an array of one or more corona discharge electrodes that extend transversely across the drum surface and are energized from a high potential source and are substantially enclosed within a shielding member.

Adjacent the charging staton in the path of motion of the xerographic drum is an exposure station B. This exposure station may be one of a number of types of mechanisms or members to expose the charged xerographic drum to a radiation image, which then causes a release of the charge on the drum in proportion to the radiation from the copy onto the surface of the drum. As shown, the exposure mechanism includes a cathode ray tube 12 connected to a suitable electronic circuit, not shown or described since it forms no part of the instant invention. Images projected by the cathode ray tube onto the image mirror 13 are reflected onto object mirror 14 for projection onto the xerographic drum, the entire projection system being enclosed in a suitable exposure housing 15 to exclude extraneous light.

Adjacent to the exposure station is a developing station C in which there is positioned a development electrode 16 which is mounted to maintain a uniform close spacing between its upper surface and the surface of the xerographic plate to form a development zone therebetween. The development electrode 16 is supplied with a powder cloud by powder cloud generator 17.

Positioned adjacent to the developing station is the image transfer station D which includes a web feeding mechanism to feed a web of paper or other suitable transfer material to the drum and a transfer mechanism to effect transfer of a developed xerographic powder image from the drum onto the transfer material. The web feeding mechanism includes a supply roll 21 for a web of transfer material 22 which is fed up and over transfer mechanism 24 into transfer contact with the drum and then down under a viewing plate 25 across a fusing apparatus, such as heat fuser 26 whereby the developed and transferred xerographic powder image on the transfer material is permanently fixed thereto from whence it is wound onto take-up roll 23.

The next and final station in the device is a drum cleaning station E, having positioned therein a plate cleaner 27 adapted to remove any powder remaining on the xerographic plate after transfer by means of rotating brushes and a light source 28 adapted to flood the xerographic plate with light to cause dissipation of any residual electrical charge remaining on the xerographic plate.

Suitable drive means and circuit means described hereinafter are used to actuate the drum, development electrode, powder cloud generator, web feed mechanism and the plate cleaning device.

Referring now to the figures for detailed structural features of the device, there is provided a frame for supporting the components of the apparatus formed by base plate 31 and side plates 32 and 33. These plaes are connected together by suitable means and the side plates are rigidly maintained in spaced relation to each other by suitable tie plates, such as plate 34.

The xerographic drum 10 is mounted on horizontally driven drum shaft 36 journaled in the side plates and bearing housing of a gear unit 47 with the drum positioned between the side plates and the major xerographic components of the machine mounted around the drum.

For driving the drum at a variable speed there is secured to plate 34 a motor MOT–2 connected by shaft coupling 41 to the input shaft of a conventional variable speed drive 37, the output speed of which can be controlled by control shaft 38 which may be either manually or automatically manipulated to vary the speed of the drum in relation to changes, for example, in the ground speed of the aircraft.

The output shaft of the variable speed drive 37 is connected by a second shaft coupling 41 to the horizontal or drive shaft 43 of a conventional right angle gear unit 42 secured to the side plate 32. Drive shaft 43 has worm 44 thereon to drive the worm gear 45 on one end of shaft 46 which, as shown, is the driven shaft of gear unit 42 and the drive shaft of a second right angle gear unit 47 also secured to the side plate 32. Worm 48 on shaft 46 drives worm gear 51 secured to the driven shaft or drum shaft 36 of this gear unit.

A shield 35 is secured to the side plates 32 and 33 in position beneath the motor MOT–2 and its associated elements to protect the drum from oil and dirt.

Shaft 46 also effects operation of the powder cloud generator 17, the shaft 46 being connected by a magnet clutch 52, designated in the electrical circuit as solenoid SOL–4, to shaft 53 having bevel gear 54 thereon which engages another bevel gear 54 on shaft 53a to drive gear 55. Gear 55 drives gear 56 attached to one end of shaft 57, the other end of the shaft being coupled by gears 58 and 59 to the drive shaft of the powder cloud generator 17.

*Charging Apparatus*

In general, the electrostatic charging of the xerographic plate in preparation for the exposure step is accomplished by means of a corona generating device whereby an electrostatic charge is applied to the plate surface as it moves relative to the charging device.

Although any one of a number of types corona generating devices may be used to charge a xerographic plate, a scorotron and its control circuit of the type disclosed in copending application Serial No. 19,846, filed concurrently herewith in the name of Joseph J. Codichini on April 4, 1960, and now U.S. Patent No. 3,062,956, is used to uniformly charge the xerographic plate at various plate speeds.

*Development System*

Referring now to the subject matter of the invention, there is provided, as shown in the drawings, a preferred embodiment of a moving screen development electrode to effect development of the previously formed electrostatic latent image on the xerographic plate.

The moving screen development electrode is positioned adjacent to the xerographic plate, with the movable screen element of the development electrode in closely spaced relation to the xerographic plate for movement in a path normal to the direction of travel of the xerographic plate, the development electrode coacting with the portion of the xerographic plate immediately adjacent thereto to form a developemnt zone wherein the charged and exposed xerographic plate is developed by a development material, usually in the form of a powder, referred to as toner.

Figure 14:
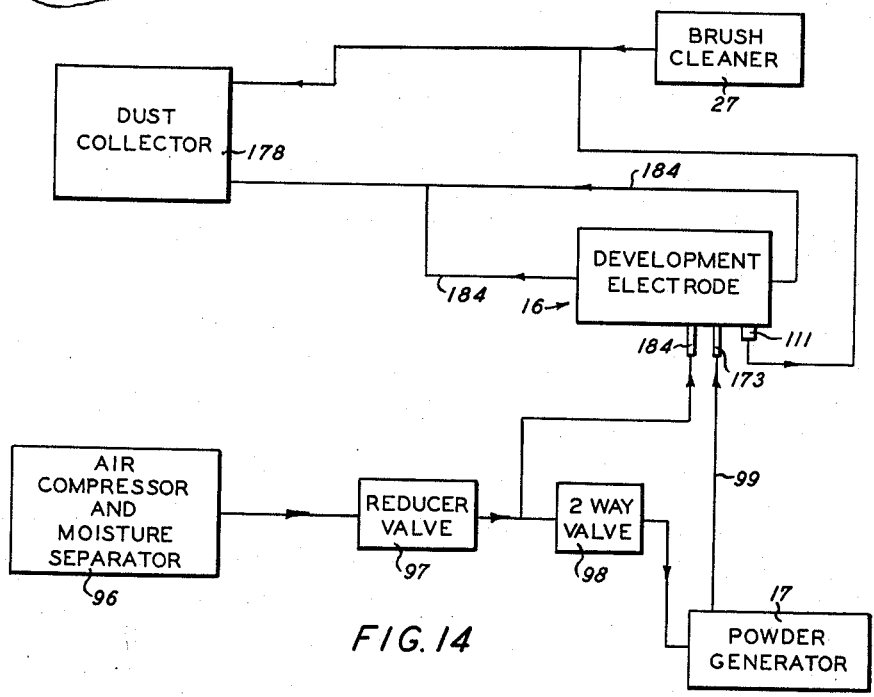
FIG. 14 is a diagrammatic view of the pneumatic system of the apparatus.

As shown in the block diagram of the developing system, FIG. 14, compressed aeriform fluid from a suitable source such as a commercial compressor 96 is delivered through suitable conduits and regulating or reducer valve 97 and two-way valve 98 to a powder cloud generator 17 of the type disclosed in copending application Serial No. 19,845, filed concurrently herewith in the name of Charles L. Huber on April 4, 1960. Within the powder cloud generator, metered quantities of developer material are dispersed in the compressed aeriform fluid to be delivered through conduit 99 to the development electrode for discharge into the development zone.

Specifically as shown in FIGS. 5 to 9, inclusive, the development electrode 16 consists of inner side plates 101 and 102 secured to and held in spaced apart parallel relation to each other by means of partial end plates 103 and base plate 104. Inner side plates 101 and 102 are secured and positioned by dowels 105 on the stepped portions of the base plate with their lower cutout portions 106 in alignment with the apertures 107 in the base plate.

A substantially U-shaped channel 108 is secured to base plate 104 as by welding the legs of the channel to the underside of the base plate to form an elongated duct 109 connected by bored holes 110 in the base plate to the apertures 107 in the base plate. In the center of the channel a discharge elbow 111 is secured to a leg of the channel 108 in alignment with the discharge opening 112 therein by screws 113 extending through the discharge elbow and threaded into the channel.

Outer side plates 114 and 115 are secured at their lower ends by screws 116 to the sides of the base plate 104 and are held in spaced parallel relation to the inner side plates 101 and 102, respectively, by end channels 117, the legs of which serve as spaces between the respective inner and outer side plates. As shown, these elements are held together by means of screws 118 which extend through an outer side plate, a leg of a channel 117 and an inner side plate, and which are threaded into a partial end plate. The lower plain ends of the channels 117 act as closure plates over the ends of channel 108 base plate 104 to form with these elements the enclosed chamber or elongated duct 109.

Although any suitable screen may be used for the electrode, in the preferred embodiment a web of 40 mesh screen 121 is used in the apparatus. Since toner particles tend to adhere to the screen during the developing process it is desirable to permit portions of the screen to be moved from an operating position relative to the xerographic plate to a non-operating position in which the screen may be cleaned. This may be accomplished by means of an endless screen web moving continually through an operating position and a non-operating position, or as shown in the preferred embodiment, a screen web of finite length is used as the screen electrode.

To support the screen and to permit the screen to be moved, there is prvoided a first reel 122 mounted on shaft 123 journaled between the inner side plates by bearings 124 and 125, to which one end of screen 121 is secured in a suitable manner in a screen slot 126 provided on the reel. From the reel 122 the screen web passes around idler roller 127 up the edge of the inner side plates and the face of the left-hand end plate 103 over and around idler roller 128 from where it is guided by slots 131 in the inner side plates across these plates over a second idler roller 128 down over a second idler roller 127 and then it is wound a number of turns onto a second reel 122 with the end of the web secured in the screen slot 126 provided therein.

The second reel 122 is mounted on shaft 129 mounted in a similar manner to shaft 123 in the side plates and each of the rollers 127 and 128 are journaled by means of bearings 124. As shown in FIGS. 7 and 8, the inner side plates are undercut to provide adequate clearance between these plates and the above-described rollers.

Each of the shafts 123 and 129 carrying the reels 122 have secured at their outer ends gears 143 and 144, respectively, by means of which the reels are rotated either clockwise or counter clockwise, as described hereinafter for moving the screen 121. Gears 143 and 144 are both driven either clockwise or counterclockwise by gear 138 on shaft 136 through idler gears 145 mounted on shafts 146. Shafts 136 and 146 are suitably journaled at one end in mounting plate 132 secured to the outer side plate 114 and at their other end in guard plate 133 held in spaced parallel relation to the mounting plate by spacers 134 and screws 135.

Shaft 136, which extends outboard of guard plate 133, is operatively connected to motor MOT–4 secured to the side plate 32 of the xerographic apparatus by chain 141, which runs on sprockets 137 and 142 fixedly mounted on shaft 136 and the shaft of motor MOT–4, respectively.

Figure 15:
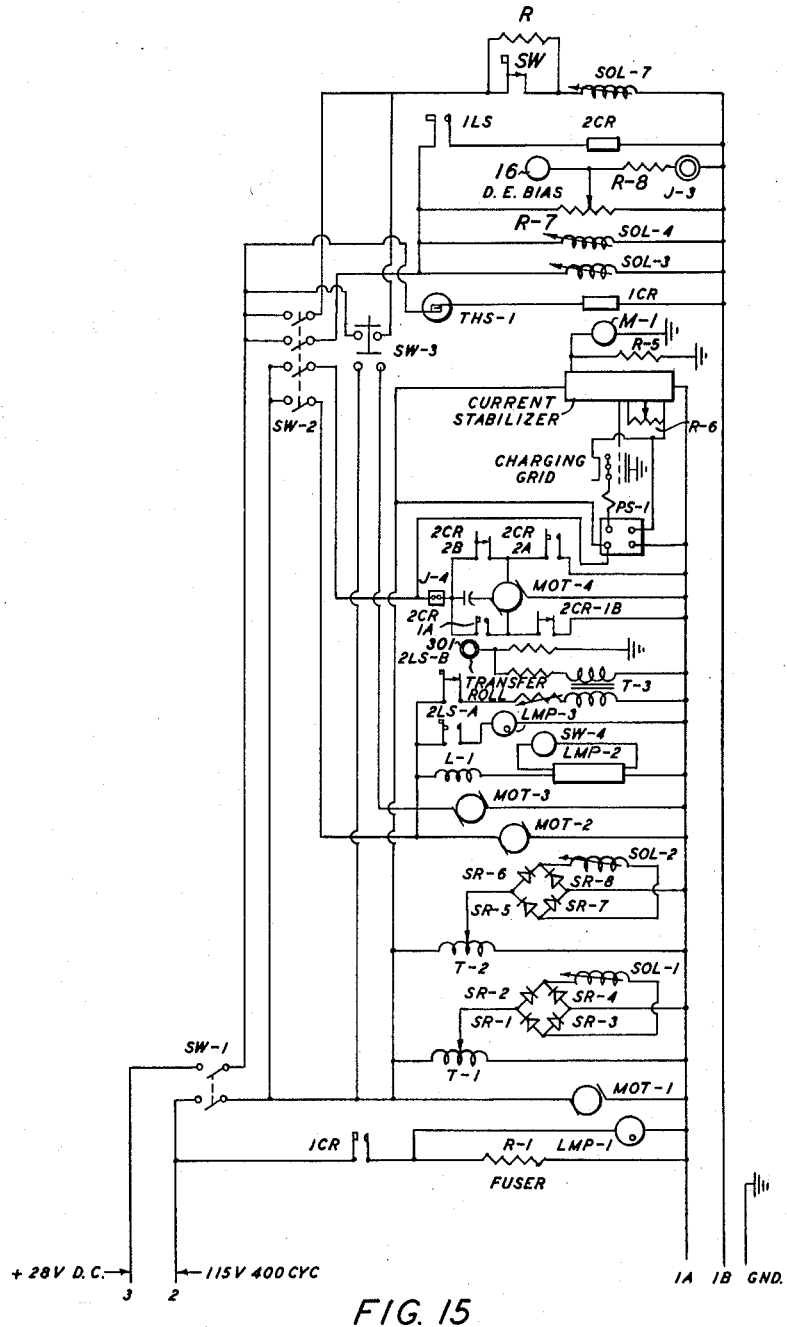
FIG. 15 is a schematic electrical wiring diagram of the xerographic apparatus.

The motor MOT–4 is connected to a source of electric power, as shown in FIG. 15, and is controlled by switching means whereby the motor is rotated either clockwise or counterclockwise by reversing the polarity of the incoming power. As shown in FIG. 15 which illustrates diagrammatically the electrical circuit of the machine, a mechanically actuated double-pole double-throw control relay 2CR is used to actuate motor MOT–4 either clockwise or counterclockwise. The relay control switch 1LS is attached to mounting plate 132 to be actuated by plungers 151 and 152 operated by actuator arms 153 and 154, respectively, attached by pins 155 to lever 156 pivotally secured to mounting plate 132 by shoulder bolt 157. Actuator arms 153 and 154, although pivotally connected to lever 156, are biased against the shoulders on the lever by means of spring 158 attached at opposite ends to the actuator arms through suitable openings therein. To effect operation of the lever there is provided a cam pin 161 secured to drive gear 138 in interference relationship with the lever 156 as drive gear 138 is rotated, it being apparent that this gear is rotated approximately one revolution before the cam pin 161 contacts lever 156 to trip the control switch to actuate the relay and to effect reversal of the motor MOT–4.

To supply developing material to the development zone between the xerographic plate and the moving screen development electrode there is provided a discharge manifold, generally designated 165, mounted between the inner side plates and connected to the partial end plates 103 by screws 166, the partial end plates serving as closure plates for the ends of the manifold. The manifold in the preferred embodiment consists of manifold block 167 having two parallel grooves 168 therein extending substantially the full length of the manifold block. Secured to the top of the manifold block is a cover plate 171 having two parallel rows of discharge nozzles 172 positioned vertically thereon with each row of discharge nozzles being in communication with a groove in the manifold block.

Figure 5:
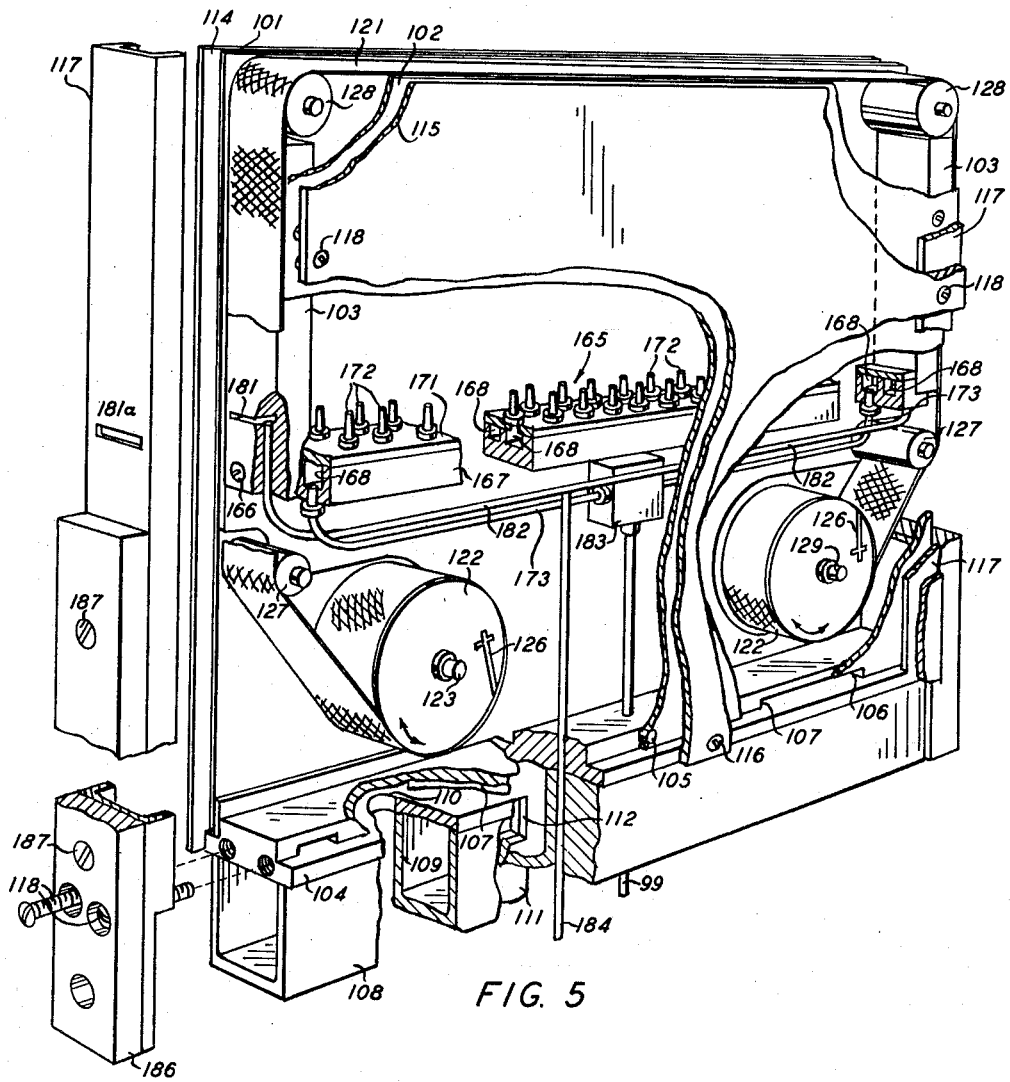
FIG. 5 is a perspective view, partly broken away, of the development electrode of the apparatus.
Figure 10:
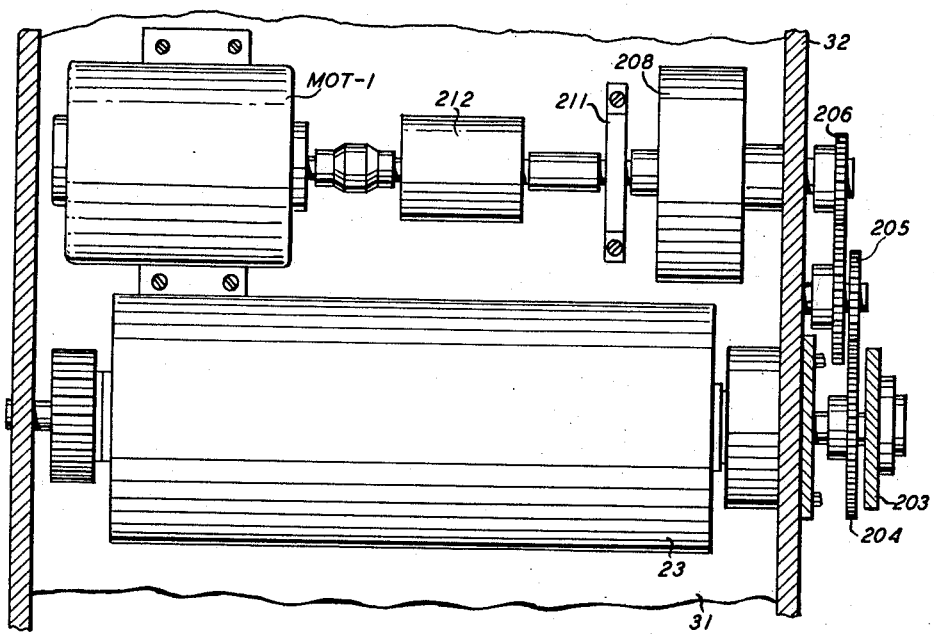
FIG. 10 is a top view of the paper take-up mechanism of the apparatus.
Figure 11:
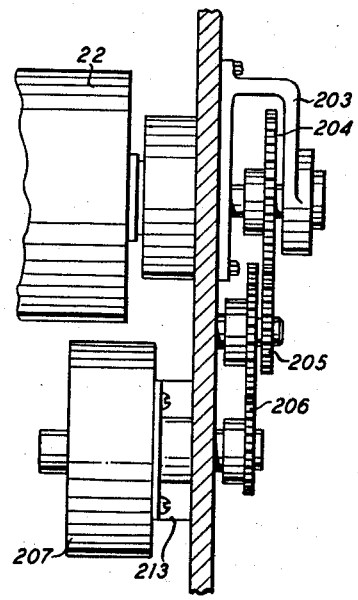
FIG. 11 is a sectional view in part of the paper supply mechanism of the apparatus taken along line 11—11 of FIG. 2.
Figures 12, 13:
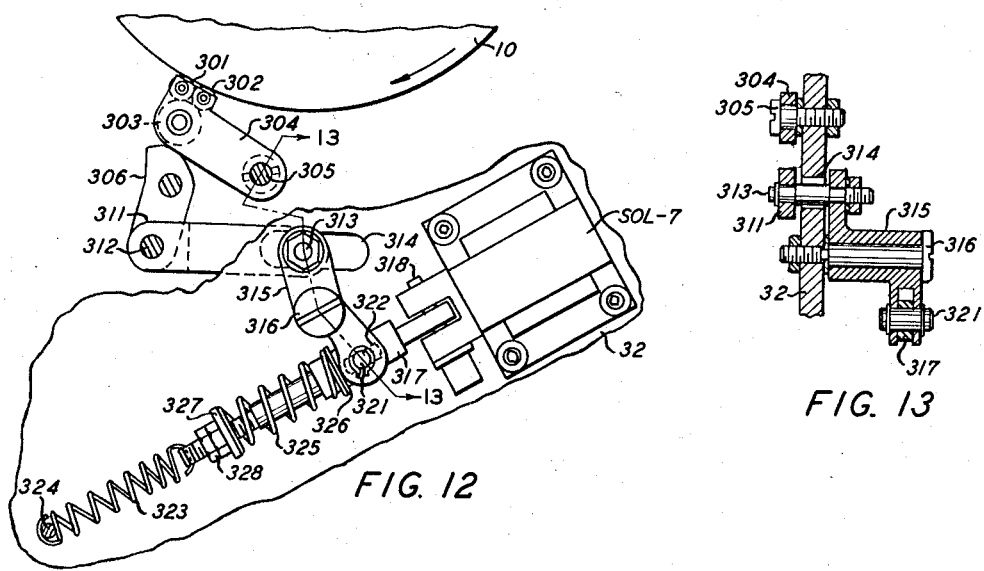
FIG. 12 is a side view, partly in section, of the transfer mechanism of the apparatus.
FIG. 13 is a sectional view taken along line 13—13 of FIG. 12.

The discharge nozzles are arranged to deliver a uniform flow of developer material in the form of a powder cloud through the openings in the screen 121 into the development zone. To permit maximum uniformity of flow, the powder cloud is delivered to the front groove 168 from the left side and to the rear groove from the right side, as seen in FIG. 5, by means of conduits 173 connected to a multiple outlet block 183 which is connected by conduit 99 extending through base plate 104 and channel 108. By flowing the powder cloud in opposite directions through the grooves the effect of a pressure drop from one end to the opposite end of one groove is canceled because the reverse pattern of flow occurs in the second groove.

With the xerographic plate moving past the development electrode and therefore past the screen 121, a uniform amount of developer powder is evenly distributed through the interstices of the screen over the entire surface of the xerographic plate immediately adjacent to the development electrode, the flow of the developer powder being substantially at right angles to the plate surface in its passage through the screen. As the developer powder particles are carried into the development zone, they selectively deposit on the surface of the xerographic plate in accordance with and in conformity with the electrostatic latent image on the xerographic plate to yield a developed xerographic print. As disclosed in Hayford Patent 2,808,023, it is desirable to provide an electric potential difference between the conductive backing of the xerographic plate and the development electrode. As shown in FIG. 15 a direct current potential is applied to the development electrode through potentiometer R–7 while the conductive backing of the xerographic plate is grounded.

As is mentioned above, no powder cloud should contact a plate bearing an electrostatic latent image where there is no electrode because image edges are preferentially developed under these conditions. Developing powder which would therefore develop a charged and exposed xerographic plate without an electrode present would be damaging to the sensitometric quality of the resultant powder image. Therefore, escaping powder must be disposed of before it can deposit on a charged and exposed surface of the plate outside of the margin of influence of the development electrode. This powder if not caught causes peculiar "non-electrode" effects.

The inner side plates 101 and 102 are spaced apart from the outer side plates 114 and 115, respectively, to form inlet ducts 175 and 176, respectively, through which excess developing powder can be removed from opposite longitudinal sides of the screen 121. These ducts communicate via the cut-out portions 106 in the inner side plates 101 and 102, apertures 107 and the bored holes 110 in the base plate 104, duct 109 and discharge opening 112 in channel 108 with the discharge elbow 111. Discharge elbow 111 is suitably connected to a conventional dust collector 178 having a blower therein as shown in FIG. 14, the latter element preferably being an auxiliary piece of equipment rather than an integral component of the xerographic machine.

During development of the electrostatic latent image on the surface of the xerographic plate, the developing powder particles are brought into the development zone between the plate and the development electrode. The screen 121, which is spaced at a slight distance from the plate, tends to build up on its surface a coating of developing powder. As long as this powder accumulation remains light, the image which is developed is ordinarily not affected adversely. However, a relatively heavy coating of developing powder on the screen interposes a new surface between the xerographic plate and the development electrode which may substantially diminish the beneficial aspects of the development electrode during the developing process. As powder particles build up on the screen the effective size of the openings in the screen is reduced thereby resulting in decreased flow of developing powder into the developing zone.

Although a number of methods may be used to clean the screen 121, in the embodiment disclosed there is provided a clean air duct 181 in each of the partial end plates 103 over which the screen passes. Each of these clean air ducts is connected by conduits 182 which are supplied with pressurized aeriform fluid through conduit 184 from air compressor 96 as seen in FIG. 14.

As the screen traverses an air duct 181, compressed aeriform fluid is discharged through the openings in the screen carrying developing powder with it. To deliver this fluid containing developing powder to a disposal point such as dust collector 178, each air duct 181 is connected through an aperture 181a formed in a channel 117 to an apertured dust block 185 and then by a conduit 184 to the dust collector 178. As shown, the dust blocks 185 are connected to opposite sides of the development electrode and are secured to frame plates 32 and 33.

To support the development electrode assembly there is positioned on the back of each end channel 117 an electrode mounting plate 186 secured to the channel and electrode assembly by means of screws 187. Each of the electrode mounting plates is provided at its lower end with a tapered aperture 188 adapted to receive the taper portion of a taper pin 191 adjustably positioned by control knob 192 having a threaded portion adjustably received by threaded boss 193 fastened to a side plate. The taper pin is suitably pinned to the threaded portion of the control knob for movement therewith. To insure proper alignment of the development electrode with respect to the drum 10, guide plates 194 are secured on the inner faces of frame plates 32 and 33, as seen in FIG. 1.

With development apparatus constructed in accordance with the invention there is provided a development electrode that is easily cleaned and permits close access development of electrostatic latent images.

Other advantages include faster development of electrostatic latent images over conventional solid manifold type electrodes because of the elimination of the narrow discharge passages used in conventional solid manifold type electrodes and there is less tendency for development to be affected by high-gradient discontinuities in the developed electrostatic image.

*Support Material Feeding Mechanism*

Since a xerographic plate, unlike photographic film, is reusable, it is desirable to transfer the developed xerographic powder image from the xerographic plate to a suitable support material to form a permanent reproduction of the image copied. The support material may be any suitable material, usually paper, either in web or cut-sheet form. In the embodiment shown the support material is in web form for reasons described hereinafter.

Figure 3:
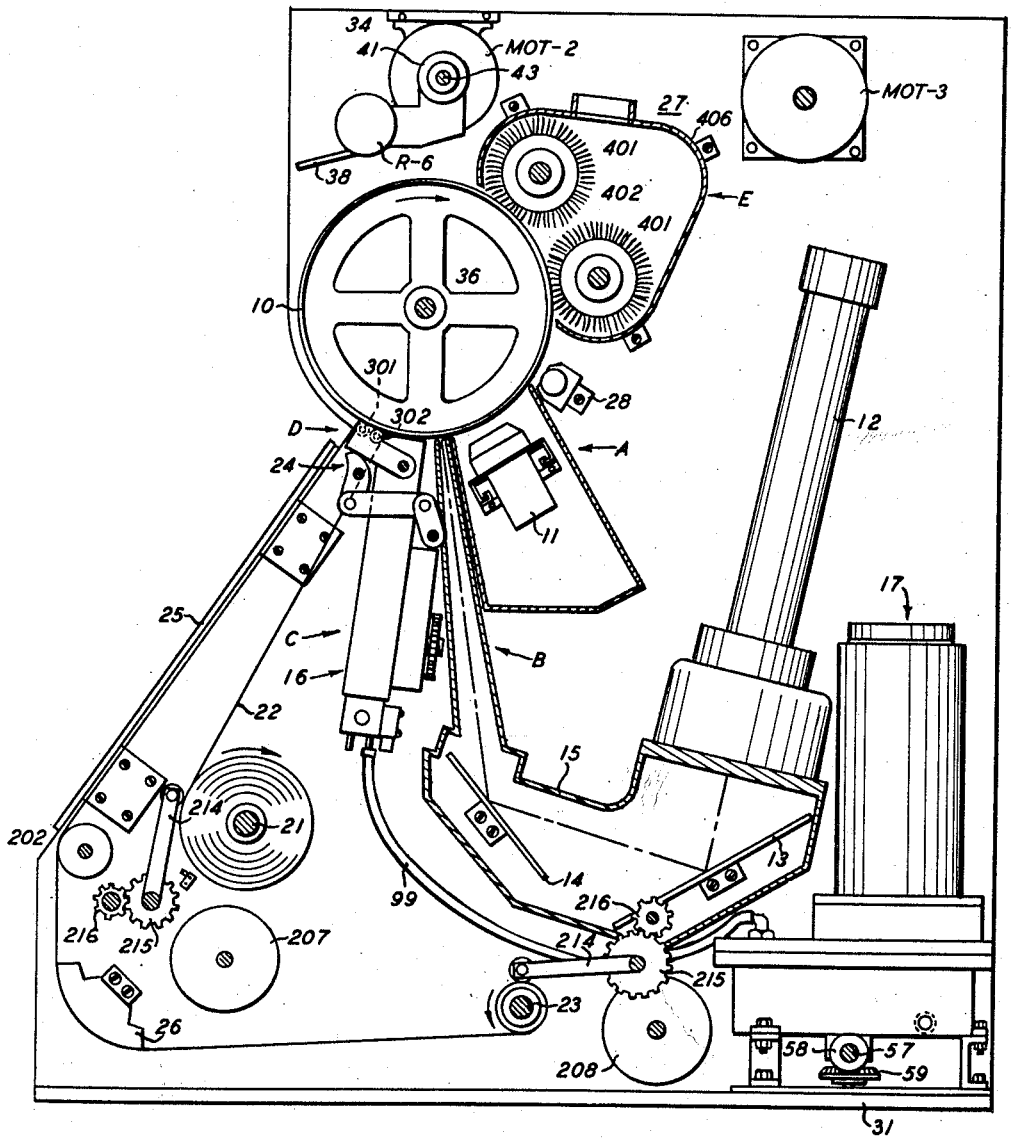
FIG. 3 is a sectional right-hand view of the apparatus taken just inside the right-hand frame plate.
Figure 4:
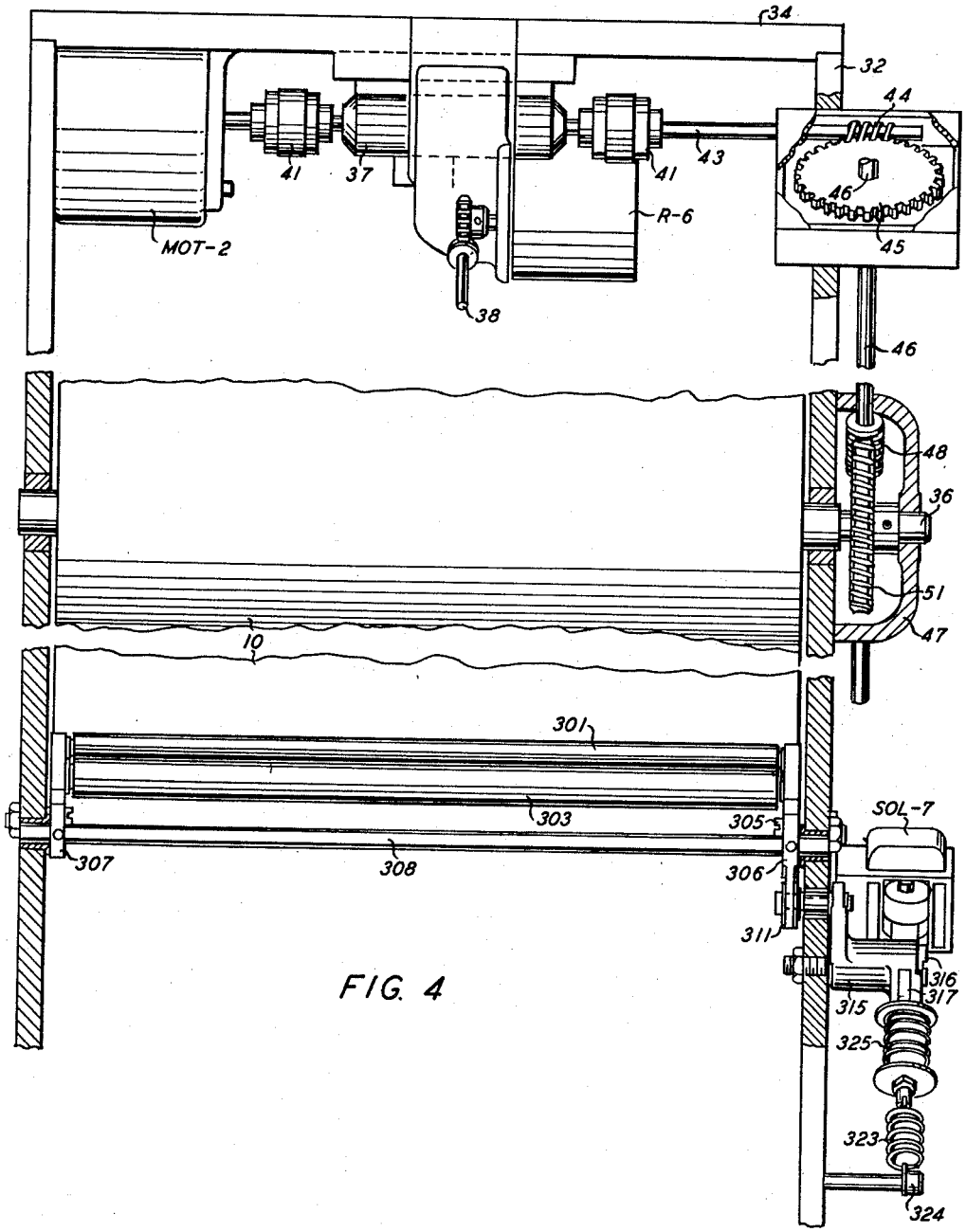
FIG. 4 is a front view of the motor drive assembly, drum drive assembly and transfer mechanism, partially in section and with parts removed, of the apparatus taken along line 4—4 of FIG. 2.

As shown, a supply of support material, hereinafter referred to as a paper web 22 is supported by a supply roll 21 from which it is fed upwardly to and over a transfer mechanism 24 into transfer contact with the xerographic plate, then down and around an idler roller 202, around heat fuser 26 having a resistance heating element R-1 therein, to the take-up roll 23. A web of support material is used in the subject machine so that an operator stationed at the front of the apparatus may view the transferred images on the paper web before the copy is fused thereon as it is fed from the transfer mechanism under the viewing plate 25 across the idler roller to the heat fuser. Referring now to FIG. 3, it can be seen that by using a development electrode of the type disclosed herein, and a transfer mechanism of the type described hereinafter, the operator can view the developed and transferred images on the paper web within a matter of seconds after xerographic plate has been exposed.

The supply roll 21 and take-up roll 23, both of conventional design, are journaled in frame plates 32, 33 and in bearing brackets 203 secured to frame plate 32, each roll being provided with a gear 204 outboard of frame plate 32.

Gear 204 on the supply roll is part of a gear train consisting of compound gear 205 and gear 206 connected to a hysteresis brake 207. Gear 204 on the take-up roll is part of a similar gear train consisting of compound gear 205 and gear 206 connected to the output shaft of hysteresis clutch 208. The output shaft of hysteresis clutch 208 is journaled in frame plate 32 and the input shaft of this clutch is journaled in pillow block 211 and connected to speed reducer 212 driven by paper take-up motor MOT-1. The hysteresis brake 207 is secured to frame plate 32 by brackets 213.

As shown in FIG. 15 the paper take-up motor MOT-1, the field of the hysteresis clutch 208 and the field of the hysteresis brake 207 are suitably connected to a source of power. The hysteresis clutch 208 and the hysteresis brake 207 are represented schematically in the electrical circuit as solenoids SOL-1 and SOL-2, respectively. These units are used to apply the proper tension to the paper web, the web being driven by the drum and a roll of the transfer device which grip the paper web with sufficient tension to draw it from the supply roll. In order to tension the paper web there must be a resisting force as well as a pulling force. The resisting force in the paper feed system is applied by brake 207 and the pulling force is applied through clutch 208.

To compensate for the changes in the diameter of the paper on the supply roll and on the paper take-up roll as the paper web is transferred from one to the other, each roll is provided with a dancer roll 214 riding on the paper web to sense the diameter of the support material on the rolls. Each dancer roll is connected through gears 215 and 216 to the rotatable element of a variac designated T-1 for use in controlling the voltage to the clutch 208 and T-2 for use in controlling the voltage to brake 207.

Using the clutch 208 as an example, when the dancer roll is resting on the core of take-up roll 23, minimum voltage should be applied to the clutch and when it is resting on a completed roll, maximum voltage should be applied to the clutch.

*Transfer Mechanism*

The transfer of the xerographic powder image from the plate surface to the support material is effected by means of transfer mechanism 24 that is located immediately after the development electrode 16 in the direction of movement of the plate. Although any suitable transfer mechanism may be used, the transfer mechanism used is of the type disclosed in copending application Serial No. 19,913, filed concurrently herewith in the names of Charles L. Huber and Harvey H. Hunter on April 4, 1960.

The transfer mechanism 24 includes a transfer roller 301 around which the paper web is transported into contact with the xerographic plate. Transfer roller 301 is desirably made of conductive rubber on a conductive metal core. The outer shell of the transfer roller is made of conductive rubber or other resilient material so as to compensate for any surface irregularities in the plate surface or paper web, and to prevent damage to the plate surface as it forces the paper web into contact therewith. During the transfer process an alternating current potential of at least 1,000 volts is applied to the transfer roller to effect electrostatic transfer of the xerographic powder image from the plate surface to the paper web.

As shown, the transfer roller 301, which is of a length at least equal to the width of the image producing area of the xerographic plate, is journaled at opposite ends in lever arms 304 pivotally secured by shoulder bolts 305 to the inner faces of frame plates 32 and 33.

Because of the charge placed on the transfer roller, powder images on the plate in the immediate vicinity of the transfer roller tend to jump off of the plate at random. If this occurs while the paper web is near the drum but not yet in contact therewith a powder image is partly transferred to the paper web before it comes into contact with the drum 10 and the remainder of the powder image is transferred to the paper web as it passes between the transfer roller and the plate.

Because of the curvature of the plate and because the charge radiates from the transfer roller in various directions this pre-transfer of a powder image results in a second image on the support material which is out of registration with the final powder image transferred onto the paper web. To prevent this from occurring there is provided a guide 302, herein shown as a roller journaled in the lever arms, positioned in advance of the transfer roller to force the paper web into intimate contact with the drum surface as it rotates toward the transfer roller 301.

Since, in the embodiment disclosed, it is desirable to view the xerographic powder images as soon as possible after they are developed, both the transfer roller and guide 302 are made relatively small in diameter and, as such, these elements are mechanically weak and need to be supported from flexing away from the plate by back-up roll 303 journaled in the lever arms 304.

Cams 306 and 307 secured to cam spindle 308 journaled in frame plates 32 and 33 are positioned to contact the lever arm 304 to move the transfer roller from a first position in which it is in cooperative relation to the plate to be driven by frictional engagement with the plate or with a paper web interposed therebetween. The lower end of cam 306 is pivotally positioned in the bifurcated end of lever 311 by pin 312. The opposite end of lever 311 is pivotally secured to one end of stud pin 313 which extends through an elongated slot 314 in frame plate 32 and has its opposite end journaled in and secured to one end of crank arm 315 pivotally secured by means of shoulder bolt 316 to frame plate 32.

For actuating this lever system there is provided an actuator arm 317 secured by pin 318 to the bifurcated end of the solenoid plunger of normally open solenoid SOL-7 secured to frame plate 32. The opposite end or bifurcated end of crank arm 315 is pivotally secured to the actuator arm 317 by means of actuator pin 321 extending through a slot 322 in the actuator arm and a suitable aperture in the crank arm. Spring 323 secured at one end to bolt 324 in frame plate 32 and at its opposite end to actuator arm 317 will bias the solenoid plunger to its extended position when the circuit to solenoid SOL-7 is open to thereby actuate the lever system to permit the transfer roller to fall by gravity or by the tension of the paper web away from the xerographic plate when the machine is not in operation and to permit threading of the paper web around the transfer roller and guide.

To permit adjustment of the contact pressure of the transfer roller with the xerographic plate to say, for example, a pressure of approximately five pounds per inch of roller length, and to prevent sudden impact damage to the xerographic plate when the transfer roller is pressed into contact thereon, there is provided spring 325 encircling the actuator arm with one end of the spring abutting spring washer 326 slidably positioned and biased against the crank arm and the other end of the spring butting against washer 327 adjustably positioned by nuts 328 on the threaded end of the actuator arm.

*Plate Cleaning Assembly*

The plate cleaning assembly includes a plate cleaner 27 and a light source 28. The plate cleaner 27 comprises a pair of rotatable brushes 401, such as fur brushes, of such construction as to apply extremely light pressure to the photoconductive surface of the xerographic plate to dislodge any powder particles that may be adhering to it after transfer. The brushes are supported and rotated by shafts 402 journaled in casing 406. The shafts 402 extend through frame plate 32 and are driven by pulleys 403 connected by belts 404 to the compound pulley 405 on motor MOT-3 adjustably secured on frame plate 32.

For containing powder particles removed from the xerographic plate by these brushes the metal casing 406 is formed to encompass the brushes except where they contact the xerographic plate and it is provided with suitable flanges for securing it to frame plates 32 and 33. An exhaust duct is arranged at the top of the casing to connect it by means of a suitable conduit to the dust collector 178 whereby the dust particles removed by the brushes are drawn from the casing.

The light source 28 attached to frame plates 32 and 33 has a conventional fluorescent lamp LMP-2 mounted therein which is used to flood a portion of the xerographic plate as it passes thereby to dissipate the residual charge thereon.

*Circuit*

A clearer understanding of the operation of the xerographic apparatus and of the electrical circuit controlling the various elements can best be obtained by reference to the schematic wiring diagram of FIG. 15.

Before starting the machine, a supply of support material 22 is placed on the supply roll 21 and then threaded up and around the rollers 301 and 302 of the transfer mechanism 24, down under platen 25, around idler roller 202, then around heat fuser 26 onto take-up roll 23. The powder cloud generator 17 is charged with a supply of developer material before pressurized fluid is delivered to the generator.

Since the compressor 96 and the dust collector 178 and its blower are preferably not an integral part of the machine and since the exposure mechanism would preferably have a separate control circuit operated independently of the control circuit of the xerographic apparatus, their operation is not described herein.

The first operation on starting the machine is for the operator to press the start button or switch SW-1. Switch SW-1 is a single-throw two-pole switch which connects the apparatus to a source of electrical power; in the embodiment disclosed, two power sources are used, a 115 volt 400 cycle alternating current power source and a 28 volt direct current power source.

Upon closure of contact of switch SW-1 in the 115 volt circuit the paper take-up motor MOT-1 is energized and the clutch 208 and brake 207 are placed in operative condition upon the energization of their solenoids SOL-1 and SOL-2, respectively. Power is transmitted to solenoid SOL-1 through the variac T-1 and the full wave rectifier circuit which includes rectifiers SR-1, SR-2, SR-3 and SR-4 and power is transmitted to solenoid SOL-2 through variac T-2 and the full wave rectifier circuit which includes rectifiers SR-5, SR-6, SR-7 and SR-8. Power is also transmitted to the high voltage power supply PS-1 and to the current stabilizer circuit, previously described, to permit warm-up of these units.

On the 28-volt direct current circuit, a switch SW-1 is closed the thermostat THS-1 is energized to effect actuation of control relay 1CR, to close its normally open contacts 1CRA in series with the resistor R-1 of the fuser 26 in the 115-volt circuit. Indicator lamp LMP-1 in parallel with resistor R-1 is energized when power is supplied to the fuser to permit visual indication to the operator that the fuser is in operation.

After the closure of switch SW-1 there is normally a short period of delay before the operator presses the print button or switch SW-2 during which time the heat fuser is permitted to reach the desired temperature for heat fixing the powder images on the support material. Upon closure of switch SW-2 the remaining electrical elements of the apparatus are energized to effect a xerographic reproducing process.

Thus as the high voltage power supply PS-1 and the current stabilizer circuit are completely energized for imposing a uniform electrostatic charge on the drum, the drum 10 is rotated by motor MOT-2, and the brushes 401 of plate cleaner 27 are driven by motor MOT-3 and the fluorescent lamp LMP-2 is energized through its conventional starter and ballast circuit.

Since it is not desired to impose a bias potential on the transfer roll 301 of the transfer mechanism when it is in contact with the drum, i.e., without support material interposed between the transfer roll and the drum, the transmission of electrical power to the transfer roll is controlled by a limit switch 2LS (not shown) suitably positioned to be actuated by the dancer roll riding on the support material of the supply roll when the supply of support material thereon is depleted. As shown in FIG. 15, the contact 2LSB of this limit switch is normally closed whereby power is transmitted to the transfer roll through rheostat R-9 and transformer T-3. When the supply of support material on the supply roll is depleted, the limit switch 2LS is actuated by the dancer roll whereby its contact 2LSB is opened to de-energize the transfer roll and its contact 2LSA is closed to energize lamp LMP-3 serving as an indicator lamp to warn the operator that the supply of support material on the supply roll is exhausted.

Motor MOT-4 used to drive the gear train for moving the screen of the development electrode first in one direction and then in an opposite direction is first energized through the normally closed contacts 2CR-1B and 2CR-2B of control relay 2CR. As previously described, the motor will drive the gear 138 in one direction until the cam pin 161 contacts the lever 156 to actuate the relay control switch 1LS which will then energize the control relay 2CR. As control relay 2CR is energized, its contacts 2CR-1B and 2CR-2B will open and its contacts 2CR-1A and 2CR-2A will close to reverse the polarity of the incoming power to the motor thereby reversing the direction of rotation of the motor.

On the 28-volt circuit, as switch SW-2 is closed, the solenoid SOL-3 is energized to open the two-way valve 98 to admit pressurized aeriform fluid to flow to the powder cloud generator 17 which begins to operate as solenoid SOL-4 of clutch 52 is energized thereby connecting shaft 46 to shaft 53. The solenoid SOL-7, for biasing the transfer roll of the transfer system into contact with the drum 10 with support material sandwiched therebetween, is energized through switch SW and resistor R connected in parallel to prevent overheating of the solenoid SOL-7. At the same time a bias potential is applied to the development electrode through the variable resistor R-7.

Normally open switch SW-3 can be actuated by the operator to permit him to run out the web of support material on the supply roll 21 without effecting a xerographic process.

While the invention has been described with reference to the structures disclosed herein, it is not confined to the details set forth, and this application is intended to cover such modifications or changes as may come within the purposes of the improvements or the scope of the following claims.

What is claimed is:

1. A development electrode for use in a xerographic apparatus having a xerographic plate mounted for rotation,
said development electrode including wall means having end walls and side walls forming an open-ended box positioned adjacent said rotatable xerographic drum, said side walls of said open box extending normal to the path of rotation of said xerographic plate,
screen support and drive means positioned adjacent said xerographic plate,
an electrically conductive screen supported by said screen support and drive means and positioned to partially close the open end of said open-ended box, said electrically conductive screen being adapted to move parallel to said side walls in a path normal to the path of movement of said xerographic plate and in closely spaced relation thereto,
spreading means positioned in said open-ended box,
said spreading means having an inlet conduit adapted to be connected to a source of an aerosol containing powdered development material and at least one discharge outlet adapted to direct powdered development material through said electrically conductive screen toward said xerographic plate,
a duct means in each of said side walls, one end of each of said duct means being adapted to be connected to a source of vacuum, and the opposite end of each of said duct means terminating in inlet ducts extending substantially the full length of said side walls in substantially parallel relation to the sides of said electrically conductive screen and adjacent thereto, whereby excess powdered developing material can be removed through said inlet ducts before it can deposit on any portion of the xerographic plate not directly adjacent said electrically conductive screen, and cleaning means positioned adjacent said end walls for cleaning said screen as it moves relative to said cleaning means.

2. A development electrode for use in a xerographic apparatus having a xerographic plate mounted for rotation,
said development electrode including wall means having end walls and side walls forming an open-ended box positioned adjacent said rotatable xerographic drum, said side walls of said open box extending normal to the path of rotation of said xerographic plate,
screen support and drive means connected to said wall means,
an electrically conductive screen movably supported by said screen support and drive means and positioned to partially close the open end of said open-ended box,
said electrically conductive screen being movable in a path normal to the path of motion of said xerographic plate and adjacent thereto,
spreading means positioned in said open-ended box,
said spreading means having an inlet conduit adapted to be connected to a source of an aerosol of development material and at least one discharge outlet adapted to direct powdered development material through said electrically conductive screen toward the xerographic plate,
a duct means in each of said side walls,
each of said duct means being adapted to be connected at one end to a source of vacuum, and terminating at its opposite end in an inlet duct extending substantially the full length of said side walls, said duct means extending parallel to the sides of said electrically conductive screen whereby excess development material is removed through said ducts before it can deposit on any portion of the xerographic plate not directly adjacent said electrically conductive screen,
and cleaning means positioned in said end walls adjacent the path of movement of the electrically conductive screen for cleaning said screen.

3. A development electrode for use in a close-access xerographic apparatus wherein a xerographic drum carrying an electrostatic latent image is mounted for rotation in closely spaced relation to the development electrode to form a development area,
said development electrode including wall means having end walls and side walls forming an open-ended box positioned adjacent said rotatable xerographic drum, said side walls having grooves therein for supporting a screen for movement in a path normal to the path of motion of the xerographic drum in the development area,
screen support and drive means connected to said wall means,
an electrically conductive screen supported by said screen support and drive means and positioned in said grooves of said side walls to partially close the open end of said open-ended box, said electrically conductive screen being adapted to move in a plane tangential to and in a direction normal to the path of motion of the xerographic drum,
spreading means positioned in said open-ended box,
said spreading means having at least one discharge outlet adapted to direct a uniform flow of powdered development material through said electrically conductive screen and an inlet conduit adapted to be connected to a source of powdered development material;
duct means in each of said side walls;
each of said duct means being adapted to be connected at one end to a source of vacuum, and terminating at the opposite in an inlet duct extending substantially the full length of said side plates, said inlet ducts of said duct means being positioned on opposite sides of said electrically conductive screen to remove excess development material thereby preventing development material from depositing on the xerographic drum in areas thereof not directly adjacent said electrically conductive screen, and cleaning means positioned in said end walls for cleaning said screen.

References Cited in the file of this patent

UNITED STATES PATENTS

| | | |
|---|---|---|
| 2,752,833 | Jacob | July 3, 1956 |
| 2,990,278 | Carlson | June 27, 1961 |
| 3,011,473 | Gundlach | Dec. 5, 1961 |